United States Patent [19]

Ahrens, deceased

[11] Patent Number: 4,718,453
[45] Date of Patent: Jan. 12, 1988

[54] ROTARY VALVE

[75] Inventor: Robert H. Ahrens, deceased, late of Janesville, Wis., by Mary Jane Ahrens, administrator

[73] Assignee: Bergstrom Manufacturing Co., Rockford, Ill.

[21] Appl. No.: 11,889

[22] Filed: Feb. 6, 1987

[51] Int. Cl.$^4$ .............................................. F16K 7/18
[52] U.S. Cl. ........................... 137/614.11; 137/614.21; 251/901
[58] Field of Search ...................... 137/614.11, 614.21; 251/84, 88, 901, 304

[56] References Cited

U.S. PATENT DOCUMENTS

| 601,634 | 5/1898 | Cotter et al. | 251/901 X |
| 2,534,577 | 12/1950 | Courtot | 251/13 |
| 3,726,313 | 4/1973 | Pandya | 137/609 |
| 4,078,764 | 3/1978 | Haffner | 251/175 |
| 4,161,184 | 7/1979 | Traut | 251/901 X |
| 4,390,036 | 6/1983 | Athanashiu et al. | 251/901 X |

FOREIGN PATENT DOCUMENTS 1393813  5/1975  United Kingdom ................ 251/304

OTHER PUBLICATIONS

Article entitled Rolling Diaphragm Seals Valve appearing at p. 84 of the Sep. 27, 1982 issue of *Design News*.

Primary Examiner—A. Michael Chambers
Assistant Examiner—John C. Fox
Attorney, Agent, or Firm—Leydig, Voit & Mayer

[57] ABSTRACT

A valve in which a rotary valve member includes rollers which support two endless belts to roll along the cylindrical wall of a valve housing as the valve member is opened and closed. The belts seal tightly against the wall and close off inlet and outlet ports when the valve member is in its closed position.

11 Claims, 9 Drawing Figures

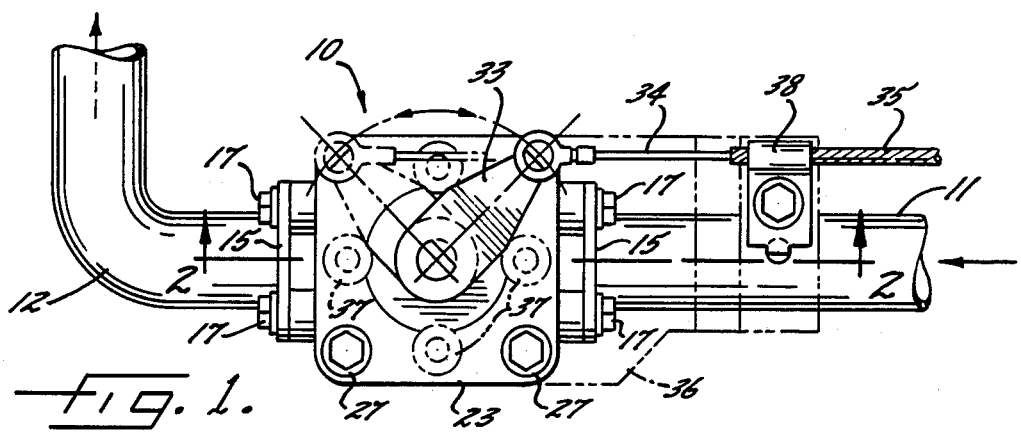
_fig. 1._
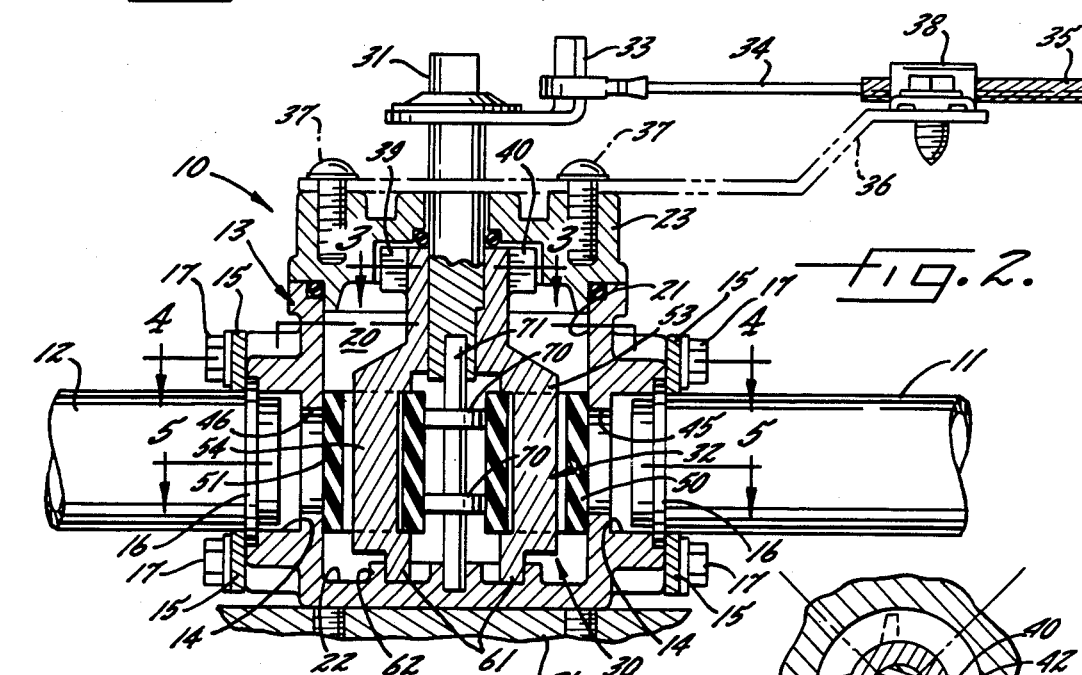
_fig. 2._
_fig. 3._
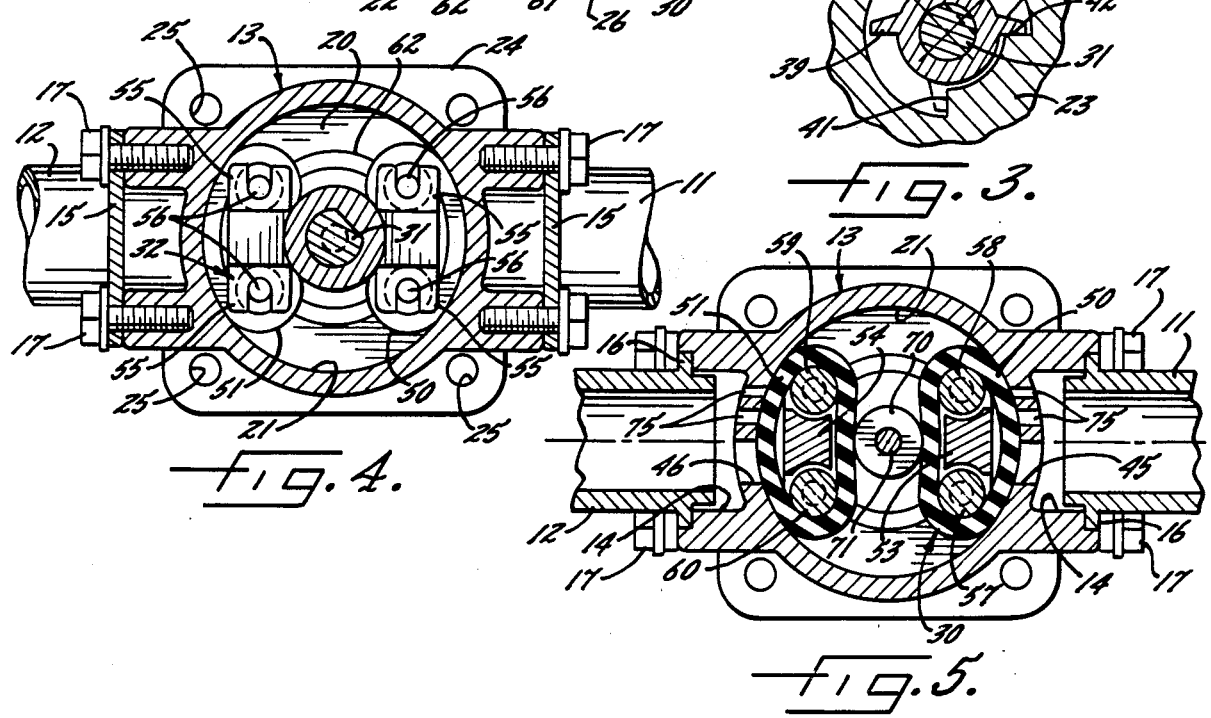
_fig. 4._
_fig. 5._

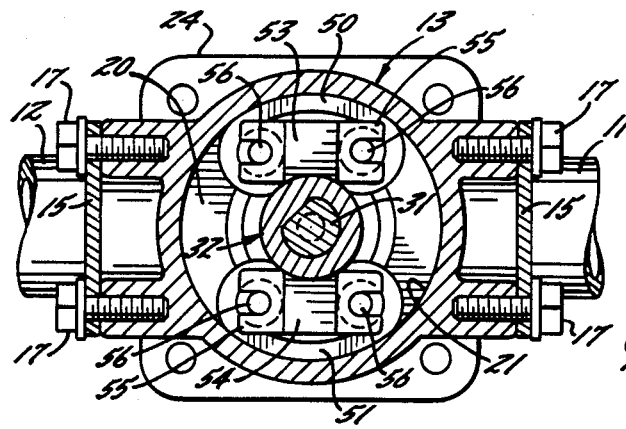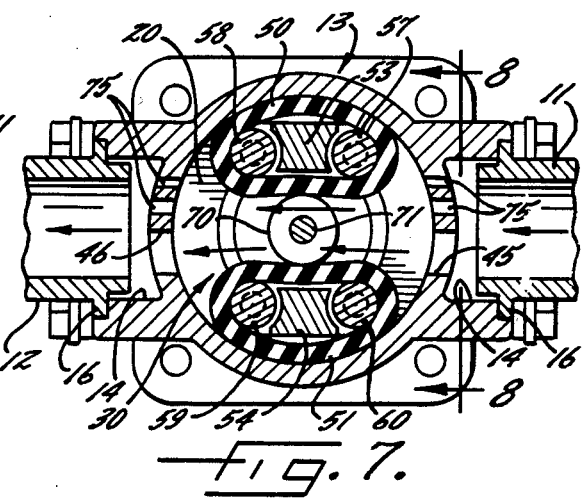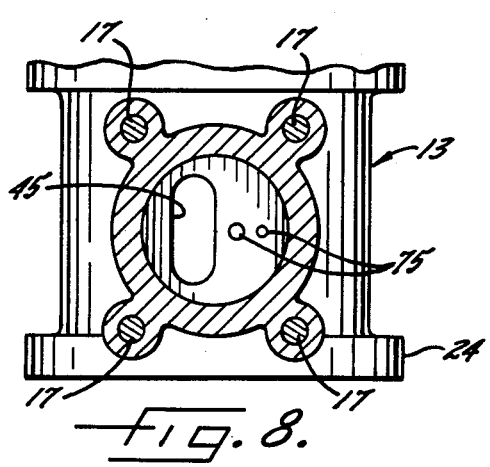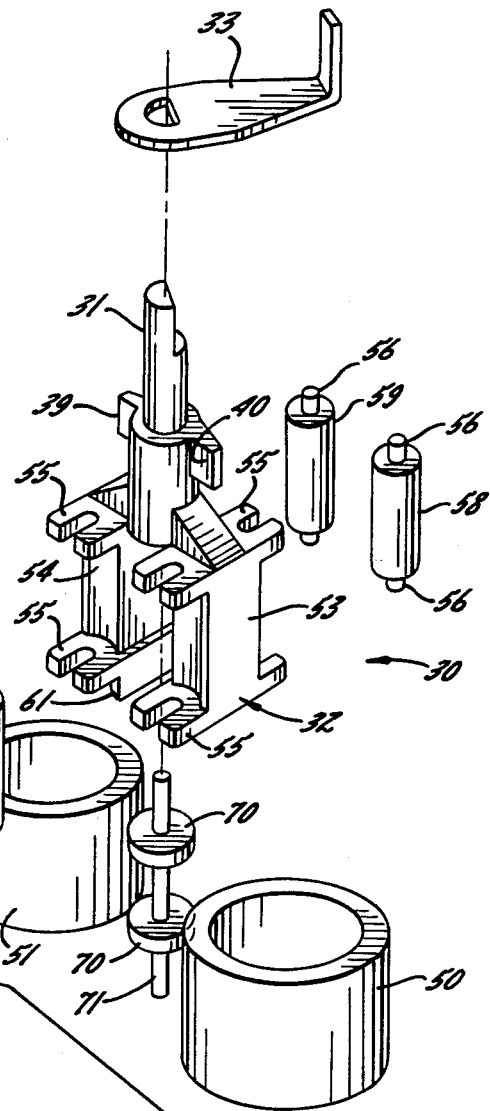

4,718,453

ROTARY VALVE

BACKGROUND OF THE INVENTION

This invention relates to a valve of the type in which a valve member is selectively rotatable within a housing between an open position permitting fluid to flow from an inlet port to an outlet port and a closed position cutting off such flow. The valve of the present invention is particularly adapted to control the flow of hot coolant to the core of the heater of a truck or other vehicle having a water cooled engine.

A coolant often contains rust, dirt or other foreign particles. Such particles tend to become trapped between the housing and the valve member of the valve and, when the valve member is rotated, the particles tend to slide along and score the mating sealing surfaces of a conventional valve. Scoring ultimately causes leakage and requires replacement of the valve.

SUMMARY OF THE INVENTION

The general aim of the present invention is to provide a relatively inexpensive rotary valve which is capable of remaining leakproof in a dirty environment over a long period of time so as to significantly increase the service life of the valve.

A more detailed object is to achieve the foregoing by providing a valve having a valve member which is uniquely equipped with endless belts adapted to seal tightly against the valve housing and to roll along the housing when the valve member is rotated. As a result of the rolling action of the belts, foreign particles tend to be rolled harmlessly toward the outlet port rather than lodging between and scoring the belts and the housing.

The invention also resides in the unique manner in which the belts are supported so as to force the belts into sealing conformance with the valve housing while avoiding high friction when the valve member is rotated.

These and other objects and advantages of the invention will become more apparent from the following detailed description when taken in conjunction with the accompanying drawings.

BRIEF DESCRIPTION OF THE DRAWINGS

FIG. 1 is a top plan view of a new and improved valve incorporating the unique features of the present invention and shows the valve installed in a typical vehicle heating system.

FIG. 2 is an enlarged fragmentary cross-section taken substantially along the line 2—2 of FIG. 1.

FIGS. 3, 4 and 5 are fragmentary cross-sections taken substantially along the lines 3—3, 4—4 and 5—5, respectively, of FIG. 2.

FIGS. 6 and 7 are views similar to FIGS. 4 and 5, respectively, but show the valve member in a moved position.

FIG. 8 is a fragmentary perspective view taken substantially along the line 8—8 of FIG. 7.

FIG. 9 is an exploded perspective view of the valve member.

DETAILED DESCRIPTION OF THE PREFERRED EMBODIMENT

For purposes of illustration, the valve 10 of the present invention has been shown in the drawings as being incorporated in a vehicle heat exchange system for controlling the flow of hot coolant (e.g., antifreeze) to a heater core (not shown) located in the passenger cab of the vehicle. Coolant is delivered to the valve via an inlet conduit 11 and flows from the valve by way of an outlet conduit 12.

The valve 10 includes a housing 13 molded of plastic and formed with alined holes 14 (FIG. 2) for receiving the inlet and outlet conduits 11 and 12. Plates 15 coact with flanges 16 on the conduits to hold the conduits in the holes, the plates being secured to the housing 13 by screws 17.

Formed within the housing 13 is a generally cylindrical chamber 20 (FIG. 2) which is defined by a cylindrical side wall 21, a bottom wall 22 and a top cap 23. An outwardly extending peripheral mounting flange 24 (FIG. 4) is integral with the bottom wall and is formed with holes 25 which may receive screws (not shown) for attaching the valve to an underlying support member 26 (FIG. 2).

The cap 23 is secured to the housing 13 by screws 27 (FIG. 1) and coacts with the bottom wall 22 to support a valve member 30 for rotation between open and closed positions with the valve chamber 20. Herein, the valve member includes an upper stem 31 (FIG. 2) made of metal and a lower spider 32 molded of plastic. The stem extends upwardly through and is rotatably supported by the cap 23 and carries a crank 33 (FIGS. 1 and 2) on its upper end. A control wire 34 which is slidably supported in a sheath 35 is connected to the crank and is operable when shifted linearly to rotate the valve member 30 through ninety degrees between fully open and fully closed positions. A mounting bracket 36 is secured to the upper side of the valve cap 23 by screws 37 (FIG. 2) and supports a clip 38 which holds the sheath.

Formed on the upper end portion of the spider 32 are two diametrically spaced lugs 39 and 40 (FIGS. 2 and 3) and which coact with stops 41 and 42 to limit the range of turning of the valve member 30 to ninety degrees. The stops are defined by two shoulders formed within the cap 23 and spaced ninety degrees from one another. When the control wire 34 is advanced from the position shown in solid lines in FIG. 1 to the position shown in phantom lines, the valve member 30 is rotated counter-clockwise until the lug 39 engages the stop 41. Retraction of the wire effects clockwise turning of the valve member 30 until the lug 40 engages the stop 42.

Inlet and outlet ports 45 and 46 (FIG. 5) are formed through the cylindrical wall 21 of the valve housing 13 and communicate with the inlet and outlet conduits 11 and 12, respectively. The ports are vertically elongated as shown in FIG. 8 and are located at opposite sides of the valve chamber 20 in generally diametrically spaced relation with one another.

In accordance with the present invention, the inlet and outlet ports 45 and 46 are adapted to be sealed by endless belts 50 and 51, respectively, which conform to and roll along the inner cylindrical wall 21 of the housing 20. By virtue of the rolling action of the belts 50 and 51, rust, dirt and other foreign particles are not trapped between and do not score the belts or the wall 21 but instead are rolled along the wall for discharge through the outlet port 46. Because scoring is prevented, the valve 10 is capable of remaining leakproof even after being operated through a great number of cycles and thus the service life of the valve is increased significantly over that of prior valves used in similar environments.

More specifically, the belts 50 and 51 are molded of a resiliently flexible material such as silicone rubber and, as originally molded, the belts are cylindrical as shown in FIG. 9. The belts are carried by the spider 32 of the valve member 30 and, for this purpose, the lower end portion of the spider is in the form of two vertically extending and transversely spaced legs 53 and 54. Notched ears 55 (FIG. 9) are formed integrally with and project in opposite directions from the upper and lower ends of each leg and are adapted to rotatably receive trunnions 56 formed on the opposite ends of brass rollers. Herein, there are four idential rollers 57, 58, 59 and 60. The ears support the rollers for free rotation about axes extending parallel to the axis of the chamber 20, the latter axis coinciding with the axis of rotation of the valve member 30. To help support the valve member for rotation about the latter axis, lugs 61 (FIGS. 2 and 9) with arcuate outer surfaces project downwardly from the lower ends of the legs 53 and 54 and are adapted to ride within a ring 62 molded integrally with and projecting upwardly from the bottom wall 22 of the housing 13.

As shown in FIG. 5, the axes of the four rollers 57 to 60 are arranged at the four corners of an imaginary rectangle whose center coincides with the axis of rotation of the valve member 30. The belt 50 is trained around the rollers 57 and 58 while the belt 51 is trained around the rollers 59 and 60. The spacing between the rollers 57 and 58 and between the rollers 59 and 60 is sufficiently large that the belts 50 and 51 are stretched from their initially cylindrical shape and are forced into a generally elliptical cross-sectional shape when the belts are trained around the rollers. As shown most clearly in FIG. 5, this causes the outer side of the outboard run of each belt to conform closely to the inner cylindrical wall 21 of the housing 13 along a substantial length of the belt. In this instance, the outer side of virtually the entire outboard run of each belt is located in intimate face-to-face engagement with the wall 21.

The valve 10 is completed by roller means which press the outer sides of the inboard runs of the belts 50 and 51 toward the legs 53 and 54 and the rollers 57, 58, 59 and 60 so as to help the outboard runs of the belts conform to the shape of the wall 21. Such roller means herein are formed by two circular discs 70 formed integrally with and spaced axially along an elongated brass spindle 71. The upper and lower end portions of the spindle are supported for rotation within holes formed in the lower end portion of the stem 31 and the bottom wall 22 of the housing 13. The axis of the spindle 71 coincides with the axis of rotation of the valve member 30, the spindle being free to rotate relative to the spider 32.

When the valve member 30 is in its fully closed position, the belts 50 and 51 are located as shown in FIGS. 4 and 5 and seal off the inlet and outlet ports 45 and 46, respectively. The discs 70 press against the inboard runs of the belts and help press the outboard runs against the cylindrical wall 21. By virtue of the belts conforming to the wall, tight seals are established at both ports to prevent flow through the valve 10.

When the valve member 30 is turned counter-clockwise toward its open position, the belts 50 and 51 roll along the chamber wall 21 and travel in a clockwise direction about the rollers 57 to 60. Because the belts roll into the wall 21 and rather than sliding therealong, foreign particles do not rub into or scratch the belts or the wall. The free-rolling rollers 57 to 60 coact with the free-rolling discs 70 to permit the belts to travel with relatively low friction.

In the fully open position of the valve member 30 as shown in FIGS. 6 and 7, both the inlet and outlet ports 45 and 46 are fully open and thus there is a relatively small pressure drop across the valve 10. If desired, additional inlet ports and outlet ports such as the ports 75 shown in FIG. 8 may be formed in the housing 13 to enable a modulated flow when the valve member is only partially open.

Because there are two belts 50 and 51, the forces acting on the valve member 30 are substantially balanced. Pressure acting against the belt 50 in the fully closed position of the valve member serves to press the belt 51 even more tightly against the wall 21 to effect a good seal at the outlet port 46. The provision of two belts also enables the valve to be bidirectional, that is, the outlet port 46 may serve as an inlet port.

We claim:

1. A valve comprising a housing having an inner wall defining a chamber of generally circular cross-section, angularly spaced inlet and outlet ports formed in said housing and communicating with said chamber, and a valve member rotatable within said chamber between a first position closing said ports and a second position opening said ports at least partially, said valve member comprising a spider supported within said housing to rotate about an axis coinciding with the axis of said chamber, first and second endless belts made of resiliently flexible material, means supporting said belts on said spider to cause said belts to turn with said spider about said axis while permitting each belt to travel in an endless path relative to said spider during such turning, said first and second belts closing said inlet and outlet ports, respectively, when said valve member is in said first position and opening said inlet and outlet ports, respectively, as said valve member is turned toward said second position, said means causing a substantial length of each belt to engage and conform with the inner wall of said housing and enabling each belt to roll along said wall as said valve member is turned between said positions.

2. A valve as defined in claim 1 in which said means comprise first and second angularly spaced pairs of angularly spaced rollers supported by said spider to rotate about axes extending parallel to the axis of rotation of said spider, the rollers of said first and second pairs being disposed within said first and second belts, respectively, and holding said belts in a stretched condition.

3. A valve as defined in claim 2 further including roller means supported for rotation relative to said spider about an axis coinciding with the axis of rotation of said spider, said roller means engaging the outer sides of the inboard runs of said belts and holding the inner sides of said inboard runs against said rollers.

4. A valve comprising a housing having an inner wall defining a chamber of generally circular cross-section, angularly spaced inlet and outlet ports formed in said housing and communicating with said chamber, and a valve member rotatable within said chamber between a first position closing said ports and a second position opening said ports at least partially, said valve member comprising a spider supported within said housing to rotate about an axis coinciding with the axis of said chamber, first and second angularly spaced pairs of angularly spaced rollers supported by said spider to rotate about axes extending parallel to the axis of rotation of said spider, and first and second endless belts trained around the rollers of said first and second pairs, respectively, said first and second belts closing said inlet and outlet ports, respectively, when said valve member is in said first position and opening said inlet and outlet ports, respectively, as said valve member is moved toward said second position, each belt being made of resiliently flexible material and engaging the inner wall of said housing in sealing conformance therewith along a substantial length of the belt, and said belts traveling around said rollers and rolling along the inner wall of said housing as said valve member is moved between said positions.

5. A valve as defined in claim 4 in which the axis of the four rollers are located at the four corners of an imaginary rectangle whose center is located along the axis of said chamber.

6. A valve as defined in claim 5 in which each belt is of circular cross-sectional shape when the flexible material of such belt is in a relaxed condition.

7. A valve as defined in claim 6 in which the rollers of each belt are spaced from one another sufficiently far to stretch the belt and cause the belt to assume a generally elliptical cross-sectional shape.

8. A valve as defined in claim 4 further including roller means supported for rotation relative to said spider about an axis coinciding with the axis of rotation of said spider, said roller means engaging the outer sides of the inboard runs of said belts and holding the inner sides of said inboard runs against said rollers.

9. A valve as defined in claim 8 in which said roller means comprise a plurality of circular discs spaced from one another along the axis of rotation of said spider.

10. A valve comprising a housing having an inner wall defining a chamber of generally circular cross-section, substantially diametrically spaced inlet and outlet ports formed in said housing and communicating with said chamber, and a valve member rotatable within said chamber between a first position closing said ports and a second position opening said ports at least partially, said valve member comprising a spider supported within said housing to rotate about an axis coinciding with the axis of said chamber, first and second angularly spaced pairs of angularly spaced rollers supported to rotate with the spider and supported by the spider to rotate relative thereto about axes extending parallel to the axis of rotation of the spider, the axes of the four rollers being located at the four corners of an imaginary rectangle whose center is located along the axis of said chamber, first and second endless belts made of resiliently flexible material, said first and second belts being trained around and stretched between the rollers of said first and second pairs, respectively, said first and second belts closing said inlet and outlet ports, respectively, when said valve member is in said first position and opening said inlet and outlet ports, respectively, as said valve member is moved toward said second position, each of said belts engaging the inner wall of said housing in sealing conformance with said wall along a substantial length of the belt and rolling along such inner wall as said valve member is moved between said positions, and roller means carried by said spider and supported for rotation relative to said spider about an axis coinciding with the axis of rotation of the spider, said roller means engaging the outer sides of the inboard runs of said belts and holding the inner sides of said inboard runs against said rollers.

11. A valve as defined in claim 10 in which each belt is of circular cross-sectional shape when the flexible material of such belt is in a relaxed condition, the rollers of each belt being spaced from one another sufficiently far to stretch the belt into a generally elliptical cross-sectional shape.

* * * * *